US006487173B2

(12) United States Patent
Tatsumi

(10) Patent No.: US 6,487,173 B2
(45) Date of Patent: *Nov. 26, 2002

(54) NETWORK SYSTEM AND COMMUNICATION DEVICE

(75) Inventor: Koji Tatsumi, Osaka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,770

(22) Filed: Mar. 16, 1998

(65) Prior Publication Data

US 2002/0003778 A1 Jan. 10, 2002

(30) Foreign Application Priority Data

Oct. 20, 1997 (JP) .............................. 9-287478

(51) Int. Cl.[7] .............................................. H04L 1/00
(52) U.S. Cl. ....................................... 370/242; 714/48
(58) Field of Search ................................ 370/216, 241, 370/242, 243, 244, 245, 246, 247, 248, 249, 250, 251, 252, 241.1; 714/48, 799, 22, 56; 379/1.01, 8, 9, 22.03

(56) References Cited

U.S. PATENT DOCUMENTS

| | | | | |
|---|---|---|---|---|
| 5,410,536 A | * | 4/1995 | Shah et al. | 370/13 |
| 5,659,540 A | * | 8/1997 | Chen et al. | 370/249 |
| 5,930,334 A | * | 7/1999 | Lundberg et al. | 379/27 |
| 5,936,941 A | * | 8/1999 | Kondo et al. | 370/242 |
| 6,006,016 A | * | 12/1999 | Faigon et al. | 714/48 |
| 6,178,528 B1 | * | 1/2001 | Poisner | 714/48 |

* cited by examiner

*Primary Examiner*—Chau Nguyen
*Assistant Examiner*—D. Trinh
(74) *Attorney, Agent, or Firm*—Katten, Muchin, Zavis Roseman

(57) ABSTRACT

A network system comprises a first communication device and a second communication device. When device failure caused in the first communication device, the first communication device generates the device failure information and transmits the device failure information to the second communication device. The second communication device receives the device failure information, and memorizes the device failure information, and makes a display unit display the device failure information.

4 Claims, 6 Drawing Sheets

NETWORK SYSTEM AND COMMUNICATION DEVICE

BACKGROUND OF THE INVENTION

The present invention relates to a network system and a communication device. Particularly, the present invention relates to a network system with ATM (Asynchronous Transfer Mode) communication devices such as ATM-HUB/ATM handler/ATM router/ATM switching unit accomodating line interfaces (NNI/UNI) of the ATM layer such as SDH/SONET/E3/DS3 (HEC/PLCP) for B-ISDN (Broadband-Integrated Service Digital Network).

In late years, as multi-media advances, B-ISDN receives attention as a leading part for next-generation communication network. Thus, it is expected that B-ISDN is used for a big and complicated network such as WAN (Wide Area Network) and OCN.

Accordingly, as for ATM communication device connected to B-ISDN, when it is expected that a communication failure occurs during the maintenance is operation, it is desirable to previously communicate contents of the communication failure to a transmission device (such as another ATM communication device and terminal) connected to another B-ISDN.

Here, in the conventional network system, concerning communication failures occurring between segments or end-to-end, the ATM communication device constituting a network notifies and detects line failures according to the following protocol so as to manage communication quality of NNI (Network Node Interface)/UNI (User Network Interface).

That is, in the conventional network system, when an ATM communication device to be a receiving device detects a communication failure such as LOS (Loss Of Signal)/LOF (Loss Of Frame)/OOP (Out Of Frame)/LOP (Loss Of Pointer)/LOP (Loss Of Cell) prescribed by SDH/SONET/E3/DS3 (HEC/PLCP), the ATM communication device transfers a failure alarm such as MS-RDI, P-RDI or P-YELLOW to an ATM communication device to be an opposing device. Then, the ATM communication device which receives a failure alarm performs the process corresponding to the failure alarm.

However, in the conventional network system, there are following problems. That is, in the conventional network system, for example, as to any ATM communication device constituting this network system, when there is a phenomenon independent of line quality such as stop by outage and a operator, an ATM communication device to be an opposite device to that ATM communication device detects a communication failure such as LOS/LOF/OOF/LOP/LOC.

However, LOS/LOF/OOF/LOP/LOC are information showing only a condition of the communication failure in the network but a cause of the communication failure. Thus, it is impossible for the ATM communication device which has detected the communication failure to know whether this communication failure is caused by quality deterioration of the network system (such as failure of ATM communication device and degradation of cable) or is caused by another cause (above-mentioned outage and stop of hand oprated power supply). As the result, in the conventional network system, there is a case that it is impossible for an ATM communication device which has detected a communication failure and an administrator of the communication device (an administrator of the network system) to deal with the communication failure according to the cause thereof.

SUMMARY OF THE INVENTION

The present invention is achieved in view of the above-described problems, and has as its object the provision of a network system and a communication device capable of dealing with communication failures more suitably than the conventional network system and communication device.

The present invention introduces the following aspects to solve the above-described problems. That is, the first aspects of the present invention is network system in which a first communication device and a second communication device are connected through a communication line. The first communication device comprises a detection unit detecting an device failure caused in the first communication device, a notification unit gererating device failure information about the device failure detected by the detection unit and transmitting the device failure information to the second communication device, and the second communication device comprises the receiving unit receiving the device failure information from the first communication device, the memory unit memorizing the device failure information received by the receiving unit, and a display control unit displaying the failure alarm and the device failure information memorized in the memory means.

According to the first aspect of the present invention, when device failure causes in the first communication device, the first communication device transmits the device failure information to the second communication device. The second communication device makes a display unit display the device failure information. Thus, the administrator of the second communication device or the administrator of the network system, when the communication failure causes between the first communication device and the second communication device, can clearly know that the communication failure is caused by the device failure of the first communication device. Thus, the administrators can deal with the communication failure appropriately.

Here, the device failure is, for example, that power supply of the first communication device is stopped by human power, that electric power to be supplied to the first communication device by a power source lowers than a predetermined value, that a registration of the communication line connecting the first communication device and the second communication device is canceled by a operator and that the communication line is physically cut by external power as the device failure.

As to first aspect of the present invention, it is preferable that the detection unit detects communication failure caused between the first communication device and the second communication device, and the notification unit generates failure alarm information about the communication failure detected by the detection unit and transmits the failure alarm information to the second communication device, and the receiving unit receives the failure alarm information from the first communication device, and the memory unit memorizes the failure alarm information by the recceiving means, and the display control unit makes a display unit display the failure alarm information memorized in the memory means.

As to first aspect of the present invention, it is preferable that further comprises a another communication device connecting to the second communication device through the communication line, and the second communication device, when the device failure information is memorized in the memory unit, transmits information equal to the device failure information to the another communication device. In this case, it is possible to transmit the device failure information to another communication device downstream from the second communication device. As another communication device, a transmission unit or a terminal equipment is also used. In addition, when a plurality of other communication devices are connected to the second communication device, it is preferable that in-device failure information is multi-cast to these communication devices.

Further, in the first aspect of the present invention, it is preferable that the first communication device and the second communication device are ATM communication devices. As ATM communication devices, it is possible to mention an ATM-HUB, an ATM router, an ATM handler, an ATM switching unit and so on. In this case, it is preferable that the notification unit generates a operation and maintenance cell storing the device failure information and transmits the cell to the second communication device and that the memory unit memorizes the device failure information extracted from the operation and maintenance cell.

The second aspect of the present invention is a communication device connected to another communication device through a communication line. The communication device comprises a receiving unit receiving device failure information about device failure caused in the another communication device from the another communication device, a memory unit memorizing the device failure information received by the receiving means, and a display control unit making a display unit display the device failure information memorized in the memory unit.

The third aspect of the present invention is a communication device connected to another communication device through a communication line and making a display unit display device failure information. The communication device comprises a detection unit detecting device failure caused in the communication device, and a notification unit gererating device failure information about the device failure detected by the detection means and transmitting the device failure information to the second communication device.

According to the network system and the communication device of the present invention, it is possible to know that a communication failure occurring between communication devices is caused by the device failure of one communication device from the other communication device, therefore, it is possible to deal with the communication failure appropriately.

DETAILED DESCRIPTION OF THE PREFERRED EMBODIMENTS

Hereinafter, explanations will be given of preferred embodiments of the present invention with reference to FIGS.

Embodiment 1

First, an explanation will be given of the Embodiment 1 according to the present invention.

[Whole Structure of Network System]

Figure 1:
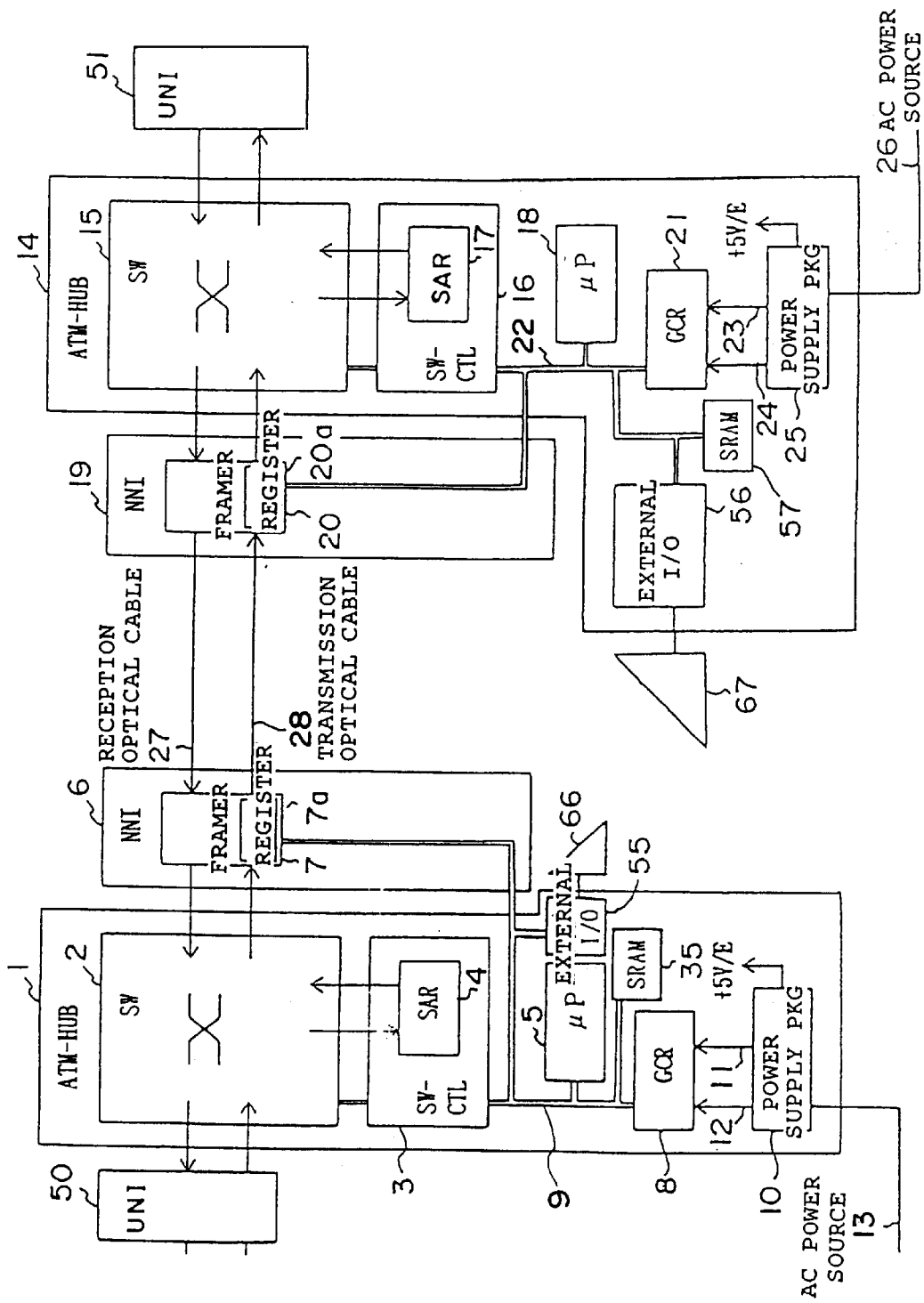
FIG. 1 is a whole block-diagram showing a network system according to Embodiment 1.

FIG. 1 is a whole block-diagram showing a network system according to Embodiment 1 of the present invention. In FIG. 1, the network system is structured as follows. That is, An ATM-HUB 1 accomodates an UNI (User Network Interface) 50 and a NNI (Network Node Interface) 6. The NNI 6 is connected to a NNI 19 through a reception optical cable 27 and a transmission optical cable 28. The NNI 19 is accepted by an ATM-HUB 14. Then, the ATM-HUB 14 accepts an UNI 51.

A plurality of user terminals not shown are connected to the UNI 50. The UNI 50 transmits ATM cell (hereinafter, called cell) received from these user terminals not shown to the ATM-HUB 1 in accordance with a predetermined transmission speed. In this embodiment, the UNI 50 transmits cells to the ATM-HUB 1 at the transmission speed according to SDH (Synchonious Digital Hierarchy).

The ATM-HUB 1, when receiving cells from the UNI 50, performs routing to the cells, and then transmits the cells to the NNI 6. On the other hand, the ATM-HUB 1 receives cells from the NNI 6 and performs routing to the received cells, thereafter, transmits each cell to the UNI 50.

The NNI 6 transmits the cells received from the ATM-HUB 1 to the NNI 19 at the transmission speed according to SDH. Explanations are omitted of a NNI 19, an ATM-HUB 14 and an UNI 51, since theses are structured similarly to the above-described NNI 6, ATM-HUB 1 and UNI 50.

[Structure of ATM-HUB]

Next, explanations will be given of structures of the ATM-HUB 1 and the ATM-HUB 14.

As shown in FIG. 1, the ATM-HUB 1 is provided with a switch (SW) 2 respectively connected to the UNI 50 and the NNI 6, a switch controller (SW-CTL) connected to the SW 2 via a bus 9, a micro processor ($\mu$P) 5, a SRAM 35, a GCR (General Control Register) 8 and an external I/O 55 mutually connected to the SW 2 via the bus 9, and a power supply package (power supply PKG) 10. The power supply package 10 is connected to an AC power source 13, and the external I/O 55 is connected to a terminal for monitoring (Maintenance Console) 66.

Additionally, the NNI 6 is provided with a framer 7 connected to the bus 9 in the ATM-HUB 1. The framer 7 is connected to the SW 2 in the ATM-HUB 1 and is connected to the NNI 10 via the reception optical cable 27 and the transmission optical cable 28.

Now, the ATM-HUB 14 and the NNI 19 are structured almost similarly to the above-described ATM-HUB 1 and NNI 6. That is, the ATM-HUB 14 is provided with a SW 15 connected to an UNI 51 and a NNI 9, a SW-CTL 16 connected to the SW 15 via a bus 22, a micro processor 18, a SRAM 57, a GCR 21 and an external I/O 56 connected to the SW-CTL 16 via the bus 22, and the power supply package 25 connected to the GCR 21. Then, the power supply package 25 is connected to an AC power source 26, and the external I/O 56 is connected to a terminal for monitoring (Maintenance Console) 67.

Additionally, the NNI 19 is provided with a framer 20 connected to the bus 22 in the ATM-HUB 14. The framer 20 is connected to the SW 15 in the ATM-HUB 14 and is connected to the NNI 6 via the reception optical cable 27 and the transmission optical cable 28.

Each component of the ATM-HUB 14 and the NNI 19 functions similarly to each component of the ATM-HUB 1 and the NNI 6, therefore, an explanations will be given of each component of the ATM-HUB 1 and the NNI 6 as a sample.

The SW 2 of the ATM-HUB 1 performs switching of cells received from the UNI 50 or the NNI 6 in accordance with instructions from the SW-CTL 3. The SW-CTL 3 controls the switching of the SW 2. The SW-CTL 3 is provided with a SAR (Segmentation and Reassembly) part 4 assembling and disassembling cells.

The SAR part 4 generates a OAM cell (Operation and Maintenance Cell) for network system maintenance in accordance with an order from the micro processor 5 or the SW-CTL 3. The OAM cell is transmitted to the ATM-HUB 14.

The micro processor 5 consists of a CPU (Central Processing Unit), a ROM (Read Only Memory) in which a control program is recorded, a RAM (Random Access Memory) to be a work area for the CPU, and so on. The micro processor 5 executes the control program recorded in the ROM, thereby controlling the SW-CTL 3, the framer 7, the GCR 8, the SRAM 35 and the external I/O 55. The GCR 8 stores information from the power supply package 10. The SRAM 35 receives information from the SW-CTL 3 and kept it.

The external I/O 55 is an I/O (Input/Output unit) based on RS-232 or 10BASE-T. The external I/O 55 converts data in the ATM-HUB 1 into a data type so that the data can be transmitted to the terminal 66, and transmits the data to the terminal 66. Further, the external I/O 55 converts the data transmitted from the terminal 66 into a data type so that the micro processor 5 can utilize the data.

The power supply package 10 receives power supplied from the AC power source 13, and functions as a +5V/E power source for each part of the ATM-HUB 1. Moreover, the power supply package 10, when the AC power source 13 cut off power to the power supply package 10 (the power supplied by the AC power source 13 is lower than a predetermined value), inputs an AC input interruption signal 12 into the GCR 8. The power supply package 10, when a not-shown the manual power supply switch of the ATM-HUB 1 becomes OFF, inputs a stop of hand operated power supply signal 11 into the GCR 8.

The terminal 66 is a personal computer or a work station provided with a processor device, a display unit (such as a CRT display and a liquid crystal display) and an input device (such as a keyboard and a mouse), and is operated by an administrator of the ATM-HUB 1 (or an administrator of the network system).

The framer 7 provided in the NNI 6 converts cells received from the ATM-HUB 1 into the ATM frame interface of SDH. That is, the framer 7 crams a plurality of cells received from the ATM-HUB 1 into a predetermined SDH frame, and then transmits the frame to the DSU 29.

Further, the framer 7 detects a communication failure occurring between the ATM-HUB 1 and the ATM-HUB 14. That is, the framer 7 detects, as communication failures, LOS (a state that no signal is transmitted from the ATM-HUB 14), LOF (a state that no frame (SDH frame) is transmitted from the ATM-HUB 14), OOF (a state that frames are transmitted from the ATM-HUB 14 but synchronized), LOP (a state that no pointer indicating a top of the cell is found) and LOC (a state that no cell transmitted from the ATM-HUB 14 is found). The framer 7 is provided with a failure indicate register 7a in which information showing communication failures (failure information), and stores the information showing the detected communication failure into the failure indicate register 7a for using the information as a failure indicator.

The micro processor 5 accesses the failure indicate register 7a regularly and monitors whether a communication failure occurs between the ATM-HUB 1 and the ATM-HUB 14 (between segments).

[Operation in Network System]

Next, explanations will be given of operations (processes by the ATM-HUB 1 and the ATM-HUB 14) in the network system according to Embodiment 1 in a plurality of states.

<Case That Hand Operated Power Supply of ATM-HUB is Stopped>

First, an explanation is given of an operation in the network system when a hand operated power supply of the ATM-HUB 1 or the ATM-HUB 14 is stopped by a operator et al. In FIG. 1, the micro processor 5 in the ATM-HUB 1 (the micro processor 18 in the ATM-HUB 14) regularly accesses the failure indicate register 7a in the framer 7 (the failure display register 20a in the framer 20), and monitors whether a communication failure occurs between the ATM-HUB 1 and the ATM-HUB 14 (between segments) or not.

Figure 2:
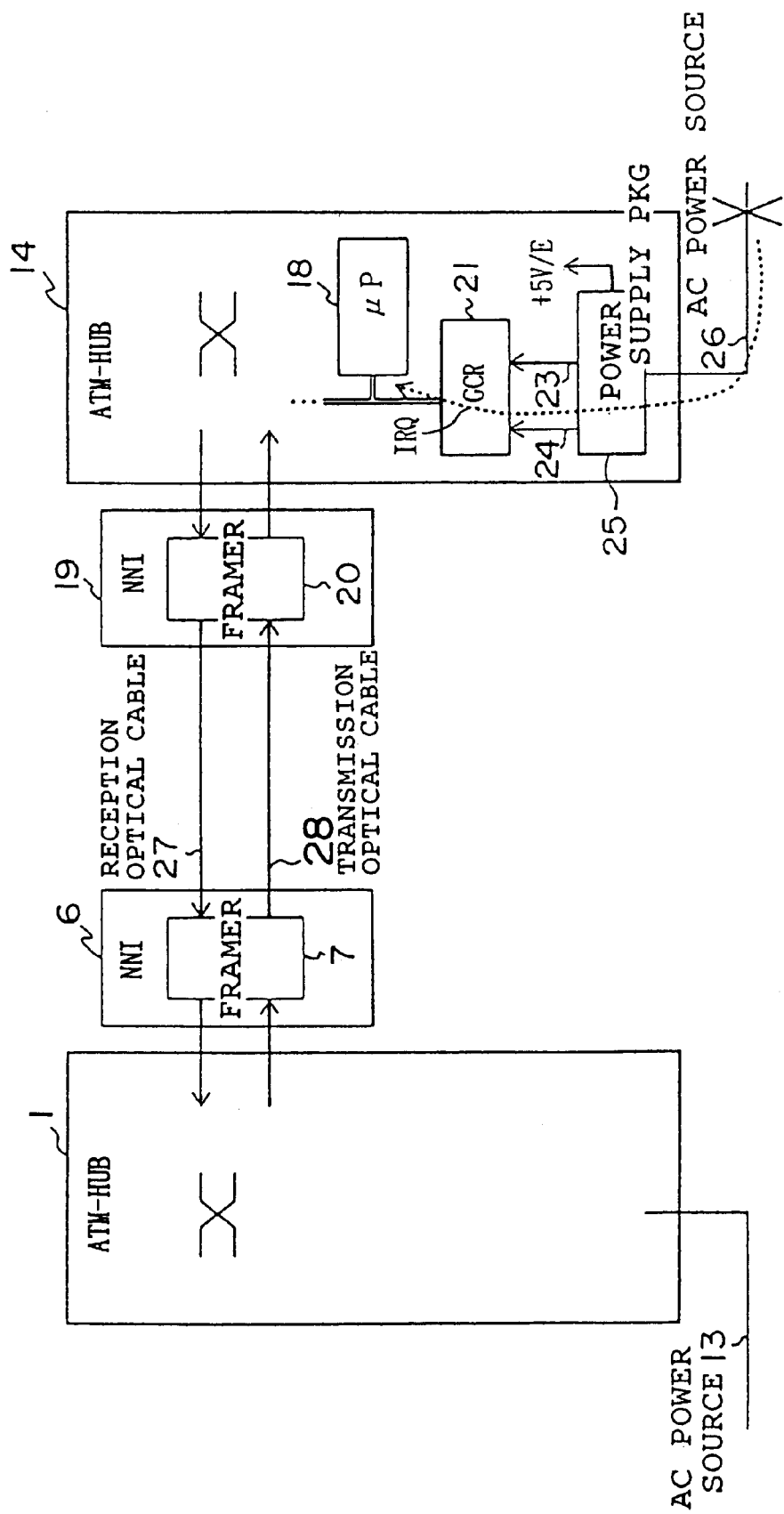
FIG. 2 is an operational explanatory view showing the network system shown in FIG. 1.

For example, as shown in FIG. 2, it is assumed that the not-shown hand operated power supply switch in the ATM-HUB 14 is turned OFF. Then, the ATM-HUB 14 becomes a state that the hand oprated power supply is a stop, and then cut off power after a predetermined time passes.

On the other hand, when the not-shown hand operated power supply switch of the ATM-HUB 14 is turned OFF, the power supply package 25 notifies a hand operated power supply stop signal 23 to the GCR 21. The GCR 21, when receiving the hand operated power supply stop signal 23, generates a break signal (IRQ in FIG. 2) indicating that the hand operated power supply switch is turned OFF and transmits it to the micro processor 18.

Figure 3:
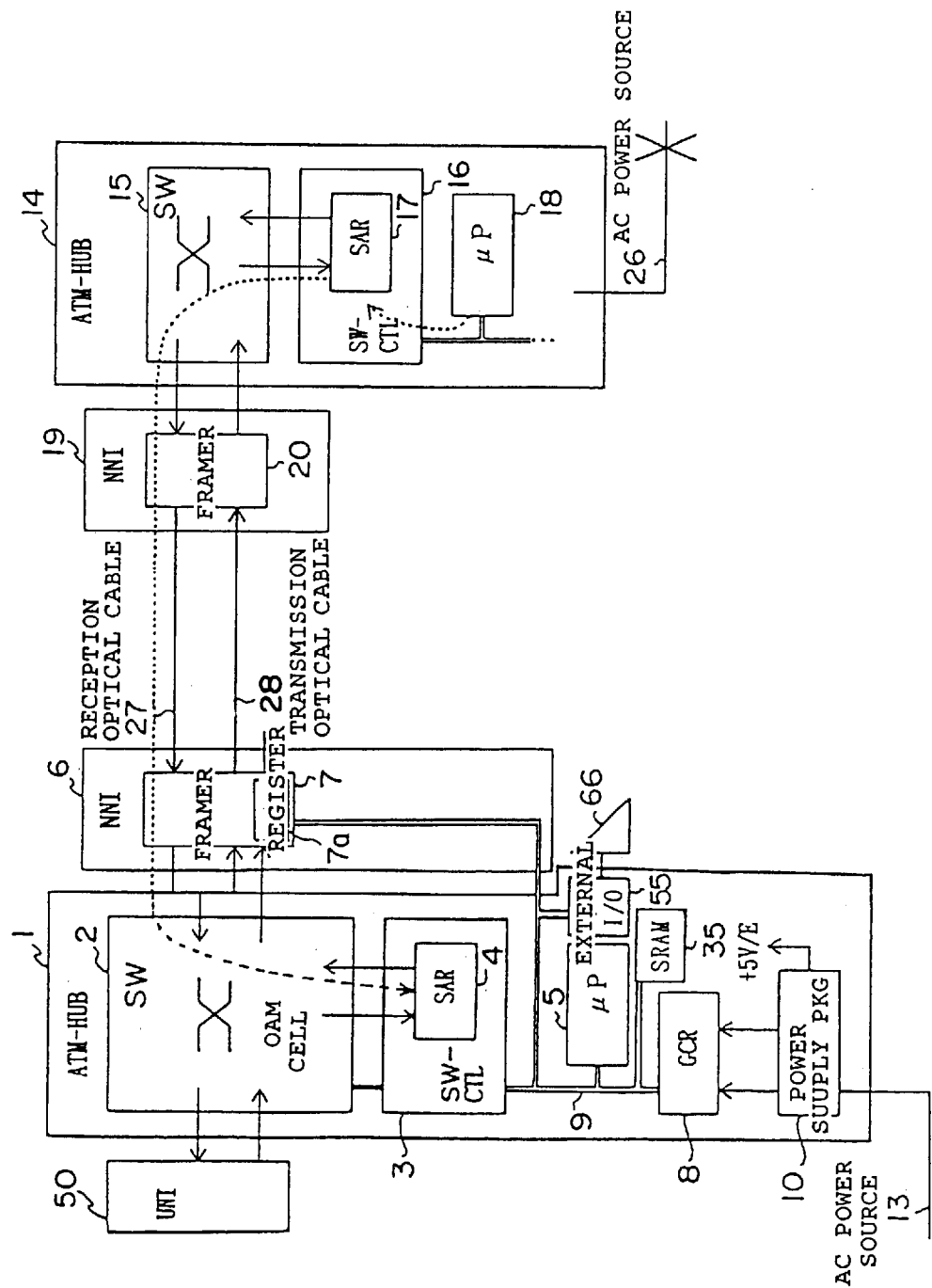
FIG. 3 is an operational explanatory view showing the network system shown in FIG. 1.
Figure 4:
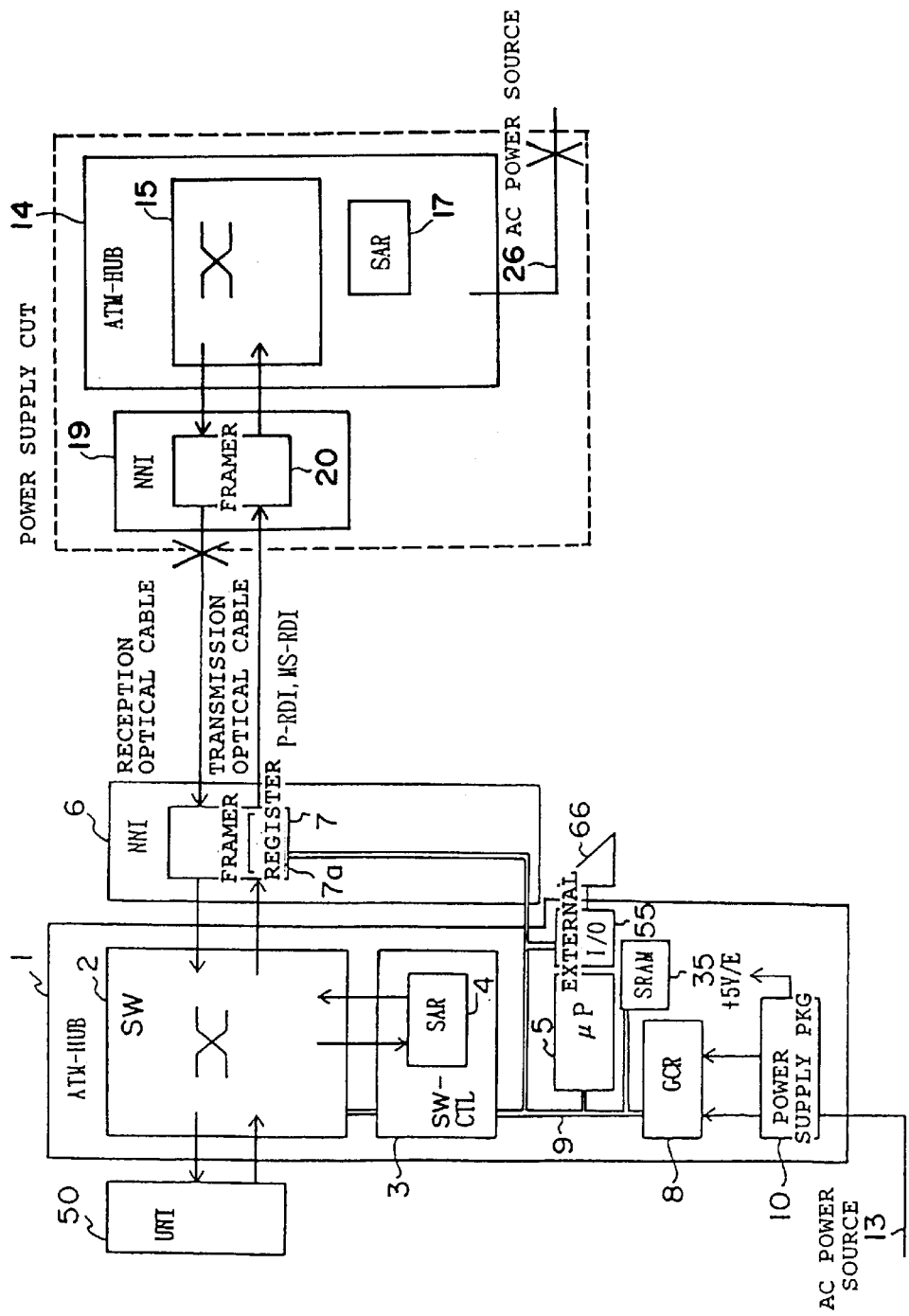
FIG. 4 is an operational explanatory view showing the network system shown in FIG. 1.

The micro processor 18, when receiving IRQ, generates a massage (a hand operated power supply stop message: corresponding to the device failure information of the present invention) indicating that the ATM-HUB 14 stops by a stop of the hand operated power supply after a predetermined time passes, and transmits the message to the SAR part 17 in the SW-CTL 16. Then, as shown in FIG. 3, the SAR part 17 generates an OAM cell in accordance with a command from the micro processor 18, and stores the hand operated power supply stop message into the OMA cell. Then, the generated OAM cell is transmitted to the NNI 19 via the SW 15.

Thereafter, the OAM cell is transmitted to the ATM-HUB 1 via the NNI 6. In the ATM-HUB 1, the OAM cell is transmitted to the SAR part 4 of the SW-CTL 3 via the SW 2. The SAR part 4 takes out the hand operated power supply stop massage containing the OAM cell received from the NNI 6, and transmits the massage to the micro processor 5. The micro processor 5 stores the hand operated power supply stop massage into the SRAM 35.

Thereafter, the ATM-HUB 14 stops by the stop of the hand operated power supply. Then, the ATM-HUB 14 stops transmitting output signals outputted from the NNI 19, the framer 7 in the NNI 6 respectively detects LOS, LOF, OOF, LOP and LOC which are failure information in the ATM-HUB 14. Then, the framer 7 stores each information indicating these communication failures in the failure indicate register 7a.

The micro processor 5 of the ATM-HUB 1 regularly accesses the failure indicate register 7a, thereby reading storage contents in the failure indicate register 7a. At that time, the micro processor 5 reads storage contents in the SRAM 35. Then, the micro processor 5 makes a display unit of the terminal 66 display an image on the basis of these contents as alarm logging.

With this arrangement, the display unit of the terminal 66 displays that a communication failure such as LOS occurs in the ATM-HUB 14 and that the ATM-HUB 14 stops by the stop of hand operated power supply cut. Accordingly, it is possible for the administrator for the ATM-HUB 1 (the administrator of the network system) to know that a communication failure occurs in the ATM-HUB 14 caused by that the power supply for the ATM-HUB 14 is manually cut.

Additionally, when the not-shown hand operated power supply switch in the ATM-HUB 1 is turned OFF, the network system operates similarly to the above operation. Thus, the terminal 67 for the ATM-HUB 14 displays that a communication failure occurs and that the ATM-HUB 1 stops caused by the stop of the hand operated power supply cut.

<Case That ATM-HUB is Stopped by Outage or the Like>

Next, an explanation is given of the action of the network system, when the ATM-HUB 1 or the ATM-HUB 14 is stopped by outage or the like. In FIG. 1, the micro processor 5 of the ATM-HUB 1 (the micro processor 18 of the ATM-HUB 14) regularly accesses the failure indicate register 7a containing the framer 7 (the failure indicate register 20a of the framer 20), and monitors whether a communication failure occurs between the ATM-HUB 1 and the ATM-HUB 14 (between segments) or not.

For example, as shown in FIG. 2, it is assumed that power supply to the power supply package 25 of the ATM-HUB 14 stopped by a outage and the like. Then, since power supply stops to the ATM-HUB 14, the ATM-HUB 14 stops acting after a predetermined time passes.

Now, when power supply from the AC power source 26 to the power supply package 25 is stopped (when power to be supplied is lower than a predetermined value), the power supply package 25 notifies the GCR 21 of an AC input interruption notification signal 24. The GCR 21, when receiving the AC input interruption notification signal 24, generates a break signal (IRG in FIG. 2) indicating that power supply from the AC power source 26 stops and transmits the signal to the micro processor 18.

The micro processor 18, when receiving the IRQ, generates a message (AC input interruption message: corresponding to the device failure information of the present invention) indicating that the ATM-HUB 14 stops by the AC input interruption after a predetermined time passes and transmits the message to the SAR part 17 of the SW-CTL 16. Then, as shown in FIG. 3, the SAR part 17 generates a OAM cell in which the AC input interruption message is stored. Then, the generated OAM cell is transmitted to the NNI 19 via the SW 15.

The sequent action is almost similar to that of the hand oprated power cut as above described, therefore, an explanation thereof is omitted. Finally, the display unit of the terminal 66 displays that a communication failure such as LOS occurs in the ATM-HUB 14 and that the ATM-HUB 14 stops acting caused by the AC input interruption.

Accordingly, it is possible for the administrator of the ATM-HUB 1 (the administrator of the network system) to know that power supply to the ATM-HUB 14 is cut off by outage, thereby stopping the ATM-HUB 14, and that a communication failure occurs between the ATM-HUB 1 and the ATM-HUB 14, based on contents displayed by the terminal 66.

Additionally, when power supply to the ATM-HUB 1 is stopped, the network system acts similarly to the above-described action. With this arrangement, the terminal 67 of the ATM-HUB 14 displays that a communication failure occurs and that the ATM-HUB 1 stops caused by outage.

<Case That Line Registration Between ATM-HUBs is Canceled>

Next, an explanation is given of the operation of the network system in a case that a line registration between the ATM-HUB 1 and the ATM-HUB 14 is canceled. For example, it is assumed that the administrator of the ATM-HUB 14 inputs a line blockade command from the terminal 67 of the ATM-HUB 14 so as to erase the line registration connecting the ATM-HUB 1 and the ATM-HUB 14.

Then, the line blockade command is transmitted to the micro processor 18 via the external I/O 56. The micro processor 18 generates a message (a line blockade message: corresponding to the device failure information of the present invention) indicating that the line blockade command is input into the ATM-HUB 14, and transmits the message to the SAR part 17 of the SW-CTL 16. The SAR part 17 generates an OAM cell in which the line blockade message is stored. Then, the generated OAM cell is transmitted to the NNI 19 via the SW 15.

The OAM cell is transmitted to the ATM-HUB 1 via the NNI 6. In the ATM-HUB 1, the OAM cell is transmitted to the SAR part 4 of the SW-CTL 3 via the SW 2. The SAR part 4 takes the line blockade message out of the OAM cell received from the NNI 6 and gives the massage to the micro processor 5. The micro processor 5 stores the line blockade message into the SRAM 35.

Thereafter, in the ATM-HUB 14, the micro processor 18 performs a line registration erasion process between the ATM-HUB 1 and the ATM-HUB 14. As the result, no output signal from the ATM-HUB 14 is transmitted to the NNI 6, therefore, the framer 7 of the NNI 6 respectively detects LOS, LOF, OOF, LOP and LOC between the ATM-HUB 1 and the ATM-HUB 14. Then, the framer 7 stores each of information indication these communication failures into the failure indicate register 7a.

The micro processor 5 of the ATM-HUB 1 regularly accesses the failure indicate register 7a, thereby reading contents in the failure indicate register 7a. At the same time, the micro processor 5 reads the contents of the SRAM 35. Then, the micro processor 5 makes the display unit of the terminal 66 display an image on the basis of these contents as alarm logging.

With this arrangement, the display unit of the terminal 66 displays that a communication failure such as LOS occurs in the ATM-HUB 14 and that a line blockade command between the ATM-HUB 1 and the ATM-HUB 14 is input into the ATM-HUB 14. Therefore, it is possible for the administrator of the ATM-HUB 1 (the administrator of the network system) to know that a line between the ATM-HUB 1 and the ATM-HUB 14 is blockaded, whereby a communication failure occurs, based on the contents displayed by the terminal 66.

In addition, the network system acts similarly to the above-described action when no line blockade command is input from the terminal 66 in the ATM-HUB 1. With this arrangement, the terminal 67 of the ATM-HUB 14 displays that a communication failure occurs and that a line blockade command is input into the ATM-HUB 1.

<Case That Optical Cable is Removed From NNI>

Next, an explanation is given of the operation of the network system in a case that the optical cable (the reception optical cable 271 and the transmission optical cable 28) connecting the NNI 6 and the NNI 19 is removed from the NNI 6 or the NNI 19.

For example, it is assumed that the administrator of the ATM-HUB 14 removes the reception optical cable 27 connected with the NNI 19. At that time, the administrator of the ATM-HUB 14, before removing the cable, inputs a command (cable cut command) indicating that the cable is removed via the terminal 67.

Then, the cable cut command is given to the micro processor 18 through the external I/O 56. The micro processor 18 generates a message (cable cut message) indicating that the reception optical cable 27 is removed from the NNI 19, and gives the message to the SAR part 17 in the SW-CTL 16. Then, the SAR part 17 generates an OAM cell in which the cable cut message. The generated OAM cell is transmitted to the NNI 19 through SW 15.

Then, the OAM cell is transmitted to the ATM-HUB 1 through the NNI 6. In the ATM-HUB 1, the OAM cell is given to the SAR part 4 in the SW-CTL 3 through the SW 2. The SAR part 4 takes the cable cut message out from the OAM cell received from the NNI 6, and gives it to the micro processor 5. The micro processor 5 stores the cable cut message in the SRAM 35.

Thereafter, the administrator of the ATM-HUB 14 removes the reception optical cable 27 from the NNI 19. As a result, since the output signal from the ATM-HUB 16 is not transmitted to the NNI 6, the framer 7 in the NNI 6 respectively detects LOS, LOF, OOF, LOP and LOC in the ATM-HUB 14. Then, the framer 7 stores respective information showing theses communication failures in the failure display register 7a.

The micro processor 5 of the ATM-HUB 1 reads contents stored in the failure indicate register 7a by periodical accesses to the failure indicate register 7a. At the same time, the micro processor 5 reads the contents stored in the SRAM 35. Then, the micro processor 5 makes the display unit of the terminal 66 show the image on the basis of these as alarm logging.

Consequently, the display unit of the terminal 66 shows that a communication failure such as LOS occurs in the ATM-HUB 14, and that the thee reception optical cable 27 is received from the NNI 19. Accordingly, the administrator of the ATM-HUB 1 (the administrator of the network system) can know that a communication failure occurs in the ATM-HUB 14 since the reception optical cable 27 is removed from the NNI 19, based on the contents displayed on the terminal 66.

In addition, when the transmission optical cable 28 is removed from the NNI 6, the administrator of the ATM-HUB 1 inputs a cable cut command through the terminal 66, whereby the network system operates similarly to the above described case. As a result, the terminal 67 of the ATM-HUB 14 displays that a communication failure occurs and the transmission optical cable 28 is removed from the NNI Effective of Embodiment 1

According to the network system of the above described embodiment 1, it is possible to notify a in-device failure occurring by a stop of hand oprated power supply of the ATM-HUB 1 and the ATM-HUB 14, AC input interruption, cancel of line registration or removing an optical cable of the administrator for ATM-HUB to be an opposite device (the administrator for the network system).

Accordingly, the administrator of the ATM-HUB 1, 14 can precisely know that a communication failure occurs because of the in-device failure, therefore, the administrator of the ATM-HUB 1, 14 can deal with the communication failure appropriately. That is, the administrator of the ATM-HUB 1, 14 can know that the communication failure is not caused by communication quality deterioration of the network system (a trouble of the cable and the communication device in the network system, therefore, it is possible to avid an useless inspection or the like for the cable and the communication device.

Embodiment 2

Next, explanations will be given of the network system of the embodiment 2 according to the present invention.

[Whole Structure of Network System]

Figure 5:
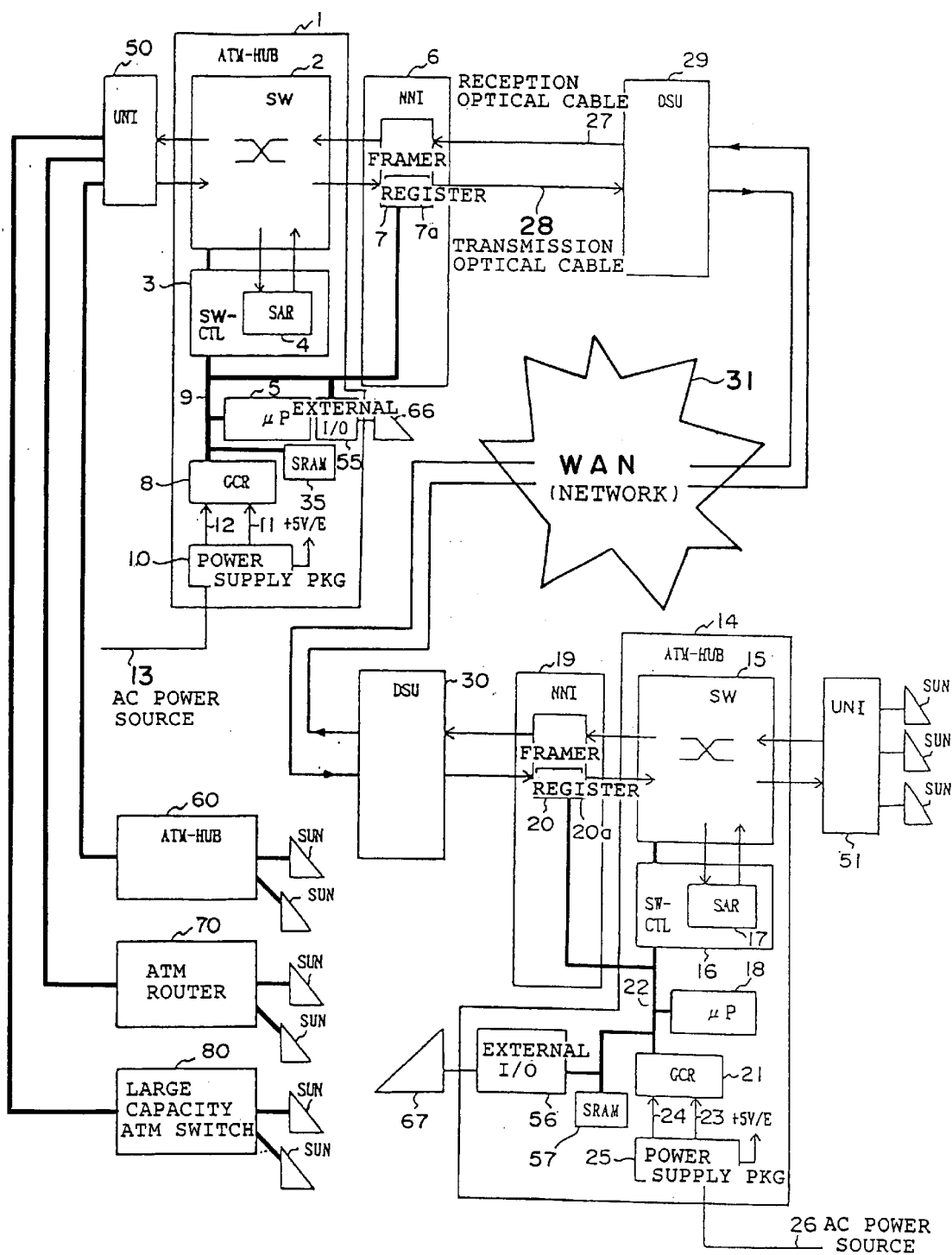
FIG. 5 is a whole block-diagram showing a network system according to Embodiment 2.

FIG. 5 is a whole block-diagram showing a network system of the embodiment 2 according to the present invention. In FIG. 5, the network system of the embodiment 2 is structured as follows. That is, the ATM-HUB 1 accepts an UNI 50. The UNI 50 is respectively connected to an ATM-HUB 60, an ATM router 70 and an ATM switch 80 through communication cables. Each of the ATM-HUB 60, the ATM router 70 and the ATM switch 80 connects a plurality of user terminal units (hereinafter, called terminal) SUN.

The ATM-HUB 1 accomodates a NNI (Network Node Interface) 6. The NNI 6 is connected to a DSU (Digital Service Unit) 29 through the reception optical cable 27 and the transmission optical cable 28. The DSU 29 is connected with a WAN (Wide Area Network) 31 through the communication line.

The WAN 31 is connected with a DSU 30 through a communication line. The DSU 30 is connected to the NNI 19 through a optical cable, and the NNI 19 is accepted by an ATM-HUB 14. The ATM-HUB 14 accepts an UNI 51, and the UNI 51 is connected with a plurality of terminals SUN.

The ATM-HUB 60, the ATM router 70 and the ATM switch 80 respectively receive cells from the terminals SUN connected to themselves and transmits the cells to the UNI 50. Then, each of the ATM-HUB 60, the ATM router 70 and the ATM switch 80 transmits the cell received from the UNI 50 to one corresponding terminal in accordance with the header information thereof.

The UNI 50 transmits the cells received from the ATM-HUB 60, the ATM router 70 and the ATM switch 80 to the ATM-HUB 1 at a predetermined transmission speed. Here, the UNI 50 transmits cells at a transmission speed according to SDH.

The ATM-HUB 1, when receiving a cell from the UNI 50, performs routing to the received cell and then transmits the cell to the NNI. The ATM-HUB 1, when receiving a cell from the NNI 6, performs routing as to the received cell and transmits the cell to the UNI 50.

The NNI 6 transmits the cell received from the ATM-HUB 1 to the DSU 29 at the transmission speed according to SDH. The NNI 6 also receives a cell from the DSU 29 and transmits this cell to the ATM-HUB 1. The DSU 29 transmits the cell received from the NNI 6 to the WAN 31. The DSU 29 also receives a cell from the WAN 31, and transmits the received cell to the NNI 6.

The WAN 31 is a digital public network (B-ISDN) consisting of plural nodes and plural lines. The WAN 31 transmits a cell received from the DSU 29 to the DSU 30 and transmits a cell received from the DSU 30 to the DSU 29. No explanation is given of the NNI 19, the ATM-HUB 14 and the UNI 51, since each of them functions similarly to each of the NNI 6, the ATM-HUB 1 and the NNI 50 which are above described.

In addition, the ATM-HUB 1, the NNI 6, the ATM-HUB 14 and the NNI 19 shown in FIG. 5 are structured almost similarly to those of Embodiment 1, therefore, explanation of them are omitted.

[Operation in Network System]

Next, explanations will be given of the operation in the network system according to the Embodiment 2 (process by the ATM-HUB 1 and the ATM-HUB 14) as to plural situations. In the network system shown in FIG. 5, when data is transmitted between one terminal SUN connected to one of the ATM-HUB 60, the ATM router 70 and the ATM switch 80 and one terminal SUM connected to the UNI 51 (end-to-end), a signaling procedure is executed. As a result, a connection establishes between terminals, and a call establishes. Then, cells are transmitted between terminals, whereby data is communicated between terminals.

<Case That Hand Operated Power Supply of ATM-HUB is stopped>

First, an explanation is given of the operation in the network system when power supply to the ATM-HUB 1 or the ATM-HUB 14 is stopped by hand during data communication between end-to-end.

In FIG. 5, the micro processor 5 of the ATM-HUB 1 (the micro processor 18 of the ATM-HUB 14) periodically accesses the failure indicate register 7a in the framer 7 (the failure indicate register 20a in the framer 20a), thereby monitoring whether a communication failure occurs between the ATM-HUB 1 and the ATM-HUB 14 (between segments) or not.

For example, a hand oprated power supply switch not shown of the ATM-HUB 14 is turned OFF, the power supply package 25 notifies the GCR 21 of the hand oprated power supply stop signal 23. The GCR 21, when receiving the hand oprated power supply stop signal 23, gives a break signal (IRQ) indicating that the not shown hand oprated power supply switch is turned OFF to the micro processor 18.

Figure 6:
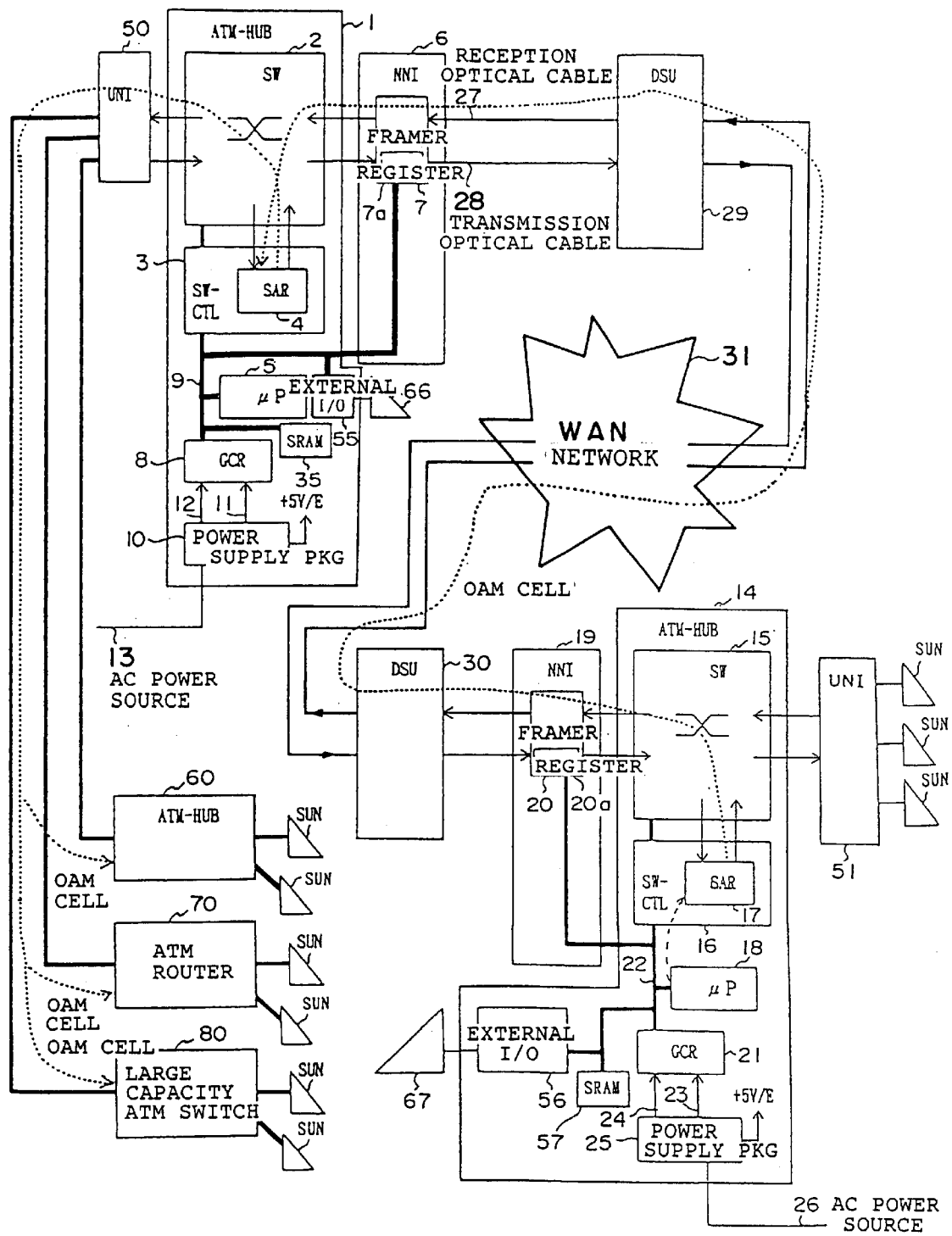
FIG. 6 is an operational explanatory view showing the network system shown in FIG. 5.

The micro processor 18, when receiving the IRQ, generates the above described hand oprated power supply cut message and gives it to the SAR part 17 of the SW-CTL 16. Then, the SAR part 17 generates an OAM cell in which the hand oprated power supply cut message is stored. The generated OAM cell, as shown in FIG. 6, is transmitted to the NNI 19 through the SW 15.

Thereafter, the OAM cell is transmitted to the ATM-HUB 1 through the NNI 19, the DSU 30, the WAN 31, the DSU 29, the reception optical cable 27 and the NNI 6. In the ATM-HUB 1, the OAM cell is given to the SAR part 4 in the SW-CTL 3 through the SW 2.

The SAR part 4, when receiving an OMA cell, generates three copies from the OAM cell. Successively, the SAR part 4 determines the ATM-HUB 60, the ATM router 70 and the ATM switch 80 as destinations for generated OAM cells. Then, theses three OAM cells are transferred to the UNI 50 through the SW 2, and then are respectively transmitted to the ATM-HUB 60, the ATM router 70 and the ATM switch 80.

In this way, the OMA cell received by the ATM-HUB 1 is broadcasted to the ATM-HUB 60, the ATM router 70 and the ATM switch 80.

Then, the SAR part 4 takes out the hand oprated power supply cut message from the OAM cell received from the NNI 6 and transmits it to the micro processor 5. The micro processor 5 stores the hand oprated power supply cut message in the SRAM 35.

Now, the ATM-HUB 14 stops operating by a stop of the hand oprated power supply after a predetermined time passes. Thus, since the transmission of the output signal of the ATM-HUB 14 via the NNI 19 stops, the DUS 30 detects LOS in the ATM-HUB 14. Then, the DSU 30 stops outputting a signal to the DSU 29. Thus, the DSU 29 detects LOS in the DSU 30. The DSU 29, when detecting LOS, transmits an AIS (Alarm Indication Signal) to the NNI 6.

The framer 7 in the NNI 6, when receiving the AIS from the DSU 29, stores information indicating that the AIS is received in the failure indicate register 7a. Then, the micro processor 5 of the ATM-HUB 1 periodically accesses the failure indicate register 7a, thereby reading the contents stored in the failure indicate register 7a. At the same time, the micro processor 5 reads the contents stored in the SRAM 35. Then, the micro processor 5 makes the display unit of the terminal 66 display an image on the basis of these contents as alarm logging.

With this arrangement, the display unit of the terminal 66 displays that the AIS is received from the DSU 29 and the ATM-HUB 14 stops by a stop of the hand oprated power supply. Thus, the administrator of the ATM-HUB 1 (the administrator of the network system), based on the displayed contents of the terminal 66, can know that the AIS is transmitted from the DSU 29 by a stop of the hand oprated power supply of the ATM-HUB 14.

Each of the ATM-HUB 60, the ATM router 70 and the ATM switch 80, when receiving the OAM cell from the UNI 50, makes a display unit not shown of the terminal connected to each of them display an image on a basis of the hand oprated power supply cut message contained in the OAM cell. Thus, each administrator of the ATM-HUB 60, the ATM router 70 and the ATM switch 80 can know that the communication failure occurs by the hand oprated power supply cut between the ATM-HUB 1 and the ATM-HUB 14.

In addition, when power supply is stopped by outage and so on, when the line registration between ATM-HUBs is canceled and when the optical cable is removed, the operation of the network system is almost similar to that of the network system of the embodiment 1, therefore, no explanation is given.

Effect of Embodiment 2

The effect of the network system according to the embodiment 2 is almost similar to the effect of the network system according to the embodiment 1. That is, it is possible to clearly know a cause of communication failure occurrence at the side of the communication device (ATM-HUB 1) which detects the communication failure, therefore, the administrator of the ATM-HUB 1 (the administrator of the network system can appropriately deal with this communication failure.

Each administrator of the ATM-HUB 60, the ATM router 70 and the ATM switch 80 can clearly know a cause of the communication failure occurring in the network system, therefore, it is possible to deal with the communication failure appropriately.

In addition, each of the UNI 50, the NNI 6, the NNI 19 and the UNI 51 transmits cells at a transmission speed according to SDH (digital hierarchy), however, each of them may transmits cells at a speed according to SONET (Synchronous Optical Network), E3 or DS-3 (Digital Signal Level-3) instead of SDH.

Further, in the embodiments 1 and 2, the network system is provided with ATM-HUB 1 and the ATM-HUB 14, however, a network system may be provided with an ATM router, an ATM handler or an ATM switch instead of the ATM-HUB 1 or the ATM-HUB 14 only when the network system is provided with one of the ATM-HUB 1 and the ATM-HUB 14.

Moreover, in the embodiments 1 and 2, the explanations are given of the ATM network system, however, the present invention may be applied to another type of network system such as frame relay network system and packet network system.

What is claimed is:

1. A network system in which a first communication device and a second communication device are connected through a communication line, the first communication device comprising:
   detection means for detecting a device failure caused in the first communication device;
   notification means for generating device failure information about the device failure detected by the detection means and transmitting the device failure information to the second communication device; and the second communication device comprising:
   receiving means for receiving the device failure information from the first communication device;
   memory means for memorizing the device failure information received by the receiving means; and
   display control means for displaying a failure alarm and the device failure information memorized in the memory means, wherein the detection means detects that a registration of the communication line connecting the first communication device and the second communication device will be canceled by an operator as the device failure, and the notification means transmits the device failure information before the registration is canceled.

2. A network system in which a first communication device and a second communication device are connected through a communication line, the first communication device comprising:
   detection means for detecting a device failure caused in the first communication device;
   notification means for generating device failure information about the device failure detected by the detection means and transmitting the device failure information to the second communication device; and the second communication device comprising:
   receiving means for receiving the device failure information from the first communication device;
   memory means for memorizing the device failure information received by the receiving means; and
   display control means for displaying a failure alarm and the device failure information memorized in the memory means, wherein the detection means detects that the communication line will be physically cut by external power as the device failure, and the notification means transmits the device failure information before the communication line is physically cut.

3. A communication device connected to an other communication device through a communication line, comprising:
   receiving means for receiving device failure information about device failure caused in the other communication device from the other communication device; and
   memory means for memorizing the device failure information received by the receiving means; and
   display control means for displaying the device failure information memorized in the memory means, wherein the device failure information indicates that a registration of the communication line connecting the communication device and the other communication device will be canceled by an operator at the other communication device, and the receiving means receives the device failure information before the registration is canceled.

4. A communication device connected to an other communication device through a communication line, comprising:
   receiving means for receiving device failure information about device failure caused in the other communication device from the other communication device;
   memory means for memorizing the device failure information received by the receiving means; and
   display control means for displaying the device failure information memorized in the memory means, wherein the device failure information indicates that the communication line will be physically cut by external power, and the receiving means receives the device failure information before the communication line is physically cut.

* * * * *